(12) United States Patent
Whiteley et al.

(10) Patent No.: US 11,455,755 B2
(45) Date of Patent: Sep. 27, 2022

(54) METHODS AND APPARATUS FOR NEURAL NETWORK BASED IMAGE RECONSTRUCTION

(71) Applicants: Siemens Medical Solutions USA, Inc., Malvern, PA (US); University of Tennessee Research Foundation, Knoxville, TN (US)

(72) Inventors: William Whiteley, Knoxville, TN (US); Jens Gregor, Knoxville, TN (US); Deepak Bharkhada, Knoxville, TN (US)

(73) Assignees: Siemens Medical Solutions USA, Inc., Malvern, PA (US); University of Tennessee Research Foundation, Knoxville, TN (US)

( * ) Notice: Subject to any disclaimer, the term of this patent is extended or adjusted under 35 U.S.C. 154(b) by 201 days.

(21) Appl. No.: 16/946,522

(22) Filed: Jun. 25, 2020

(65) Prior Publication Data

US 2021/0074034 A1 Mar. 11, 2021

Related U.S. Application Data

(60) Provisional application No. 62/896,018, filed on Sep. 5, 2019.

(51) Int. Cl.
*G06T 11/00* (2006.01)
*G06T 7/00* (2017.01)
(Continued)

(52) U.S. Cl.
CPC ............. *G06T 11/005* (2013.01); *G06N 3/04* (2013.01); *G06N 3/08* (2013.01); *G06T 7/0012* (2013.01);
(Continued)

(58) Field of Classification Search
CPC ............... A61B 6/5205; G06T 11/006; G06T 2207/20084
See application file for complete search history.

(56) References Cited

U.S. PATENT DOCUMENTS 10,987,021 B2 * 4/2021 Takeshima ......... G01R 33/5611
2019/0130569 A1 * 5/2019 Liu ....................... G06T 7/0014
(Continued)

FOREIGN PATENT DOCUMENTS

WO WO-2018126396 A1 * 7/2018 ........... A61B 6/5205
WO WO-2019067524 A1 * 4/2019 ............... A61B 3/14

OTHER PUBLICATIONS

Ida Häggström, C. Ross Schmidtlein, Gabriele Campanella, Thomas J. Fuchs, DeepPET: A deep encoder-decoder network for directly solving the PET image reconstruction inverse problem, 2019, Medical Image Analysis, vol. 54,pp. 253-262. (Year: 2019).*

(Continued)

*Primary Examiner* — Gandhi Thirugnanam

(57) ABSTRACT

Systems and methods for reconstructing medical images are disclosed. Measurement data, such as sinogram data, is received from an image scanning system. A plurality of masks are applied to corresponding portions of the measurement data to generate a plurality of masked measurement data portions. In some examples, the measurement data is encoded before the plurality of masks are applied. A neural network including a plurality of fully connected layers is applied to the plurality of masked measurement data portions to generate a plurality of image patches. The plurality of image patches are then combined to generate an initial image. In some examples, refinement and scaling operations are applied to the initial image and corresponding attenuation maps to generate a final image. In some examples, the (Continued)

final image is stored in a database. In some examples, the final image is displayed for diagnosis.

20 Claims, 16 Drawing Sheets

(51) Int. Cl.
    *G06T 9/00*     (2006.01)
    *G06N 3/04*     (2006.01)
    *G06N 3/08*     (2006.01)

(52) U.S. Cl.
    CPC ...... *G06T 9/00* (2013.01); *G06T 2207/10081* (2013.01); *G06T 2207/10104* (2013.01); *G06T 2207/20036* (2013.01); *G06T 2207/20084* (2013.01); *G06T 2207/30004* (2013.01)

(56) References Cited

U.S. PATENT DOCUMENTS

| | | | |
|---|---|---|---|
| 2019/0221011 A1* | 7/2019 | Ye | G06T 5/50 |
| 2019/0328348 A1* | 10/2019 | De Man | G06T 11/008 |
| 2020/0043204 A1* | 2/2020 | Fu | G06N 3/0454 |
| 2020/0161005 A1* | 5/2020 | Lyman | G06K 9/6262 |
| 2020/0196972 A1* | 6/2020 | Zhou | A61B 6/5205 |
| 2020/0250820 A1* | 8/2020 | Kunze | G06T 11/008 |
| 2021/0012541 A1* | 1/2021 | Lee | G06N 3/08 |
| 2021/0035338 A1* | 2/2021 | Zhou | G06N 20/20 |
| 2021/0074034 A1* | 3/2021 | Whiteley | G06T 9/00 |
| 2021/0104079 A1* | 4/2021 | Whiteley | G06N 3/0454 |

OTHER PUBLICATIONS

Argyrou, Maria, et al. "Tomographic image reconstruction based on artificial neural network (ANN) techniques." 2012 IEEE Nuclear Science Symposium and Medical Imaging Conference Record (NSS/MIC) IEEE, 2012.

Floyd, C. E., et al. "Artificial neural networks for SPECT image reconstruction with optimized weighted backprojection." Conference Record of the 1991 IEEE Nuclear Science Symposium and Medical Imaging Conference. IEEE, 1991.

Zhu, Bo, et al. "Image reconstruction by domain-transform manifold learning." Nature 555.7697 (2018): 487-492.

Bevilacqua, A., et al. "A new approach to image reconstruction in positron emission tomography using artificial neural networks." International Journal of Modern Physics C 9.01 (1998): 71-85.

Whiteley, William, Wing K. Luk, and Jens Gregor. "DirectPET: full-size neural network PET reconstruction from sinogram data." Journal of Medical Imaging 7.3 (2020): 032503.

Whiteley, William, and Jens Gregor. "Direct image reconstruction from raw measurement data using an encoding transform refinement-and-scaling neural network." 15th International Meeting on Fully Three-Dimensional Image Reconstruction in Radiology and Nuclear Medicine. vol. 11072. International Society for Optics and Photonics, 2019.

Paschalis, P., et al. "Tomographic image reconstruction using artificial neural networks." Nuclear Instruments and Methods in Physics Research Section A: Accelerators, Spectrometers, Detectors and Associated Equipment 527.1-2 (2004): 211-215.

* cited by examiner

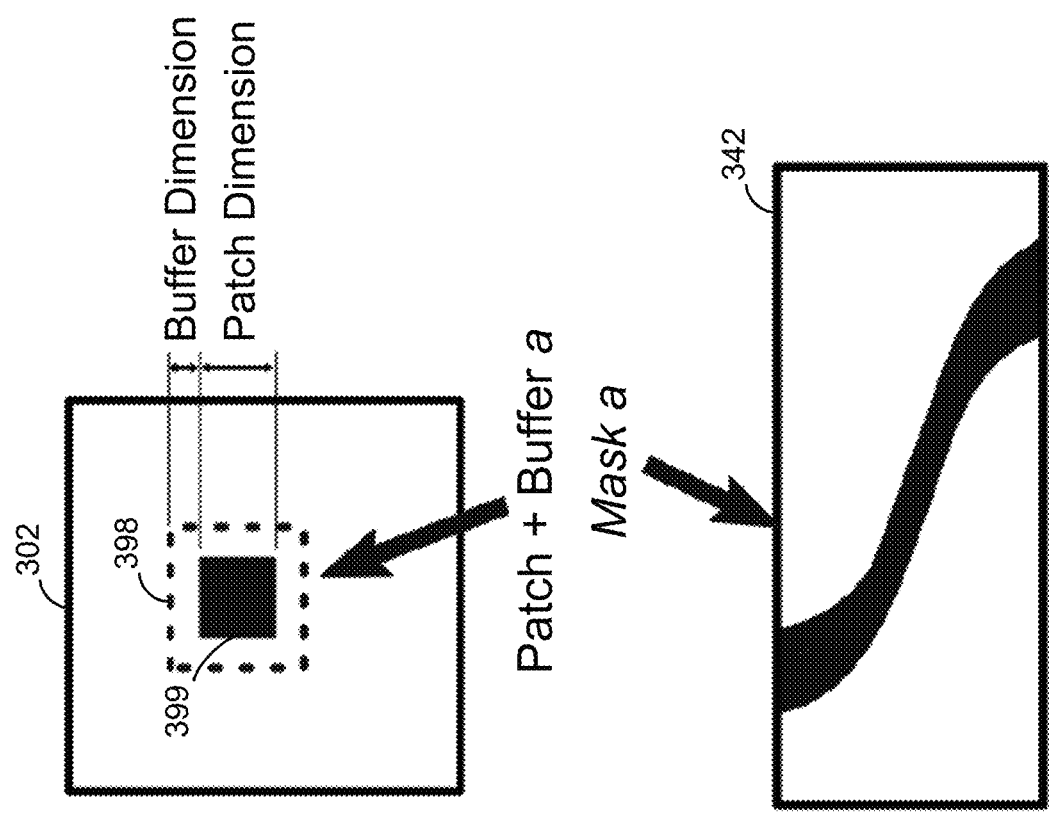

METHODS AND APPARATUS FOR NEURAL NETWORK BASED IMAGE RECONSTRUCTION

CROSS-REFERENCE TO RELATED APPLICATIONS

The application claims the benefit of U.S. Provisional Patent Application No. 62/896,018, filed Sep. 5, 2019, and entitled "Efficient Neural Network Image Reconstruction from Raw Data Using a Radon Inversion Layer," which is hereby incorporated by reference in its entirety.

FIELD

Aspects of the present disclosure relate in general to medical diagnostic systems and, more particularly, to reconstructing images from nuclear imaging systems for diagnostic and reporting purposes.

BACKGROUND

Nuclear imaging systems can employ various technologies to capture images. For example, some nuclear imaging systems employ positron emission tomography (PET) to capture images. PET is a nuclear medicine imaging technique that produces tomographic images representing the distribution of positron emitting isotopes within a body. Some nuclear imaging systems employ computed tomography (CT). CT is an imaging technique that uses x-rays to produce anatomical images. Magnetic Resonance Imaging (MRI) is an imaging technique that uses magnetic fields and radio waves to generate anatomical and functional images. Some nuclear imaging systems combine images from PET and CT scanners during an image fusion process to produce images that show information from both a PET scan and a CT scan (e.g., PET/CT systems). Similarly, some nuclear imaging systems combine images from PET and MRI scanners to produce images that show information from both a PET scan and an MRI scan.

Typically, these nuclear imaging systems capture measurement data, and process the captured measurement data using mathematical algorithms to reconstruct medical images. For example, reconstruction can be based on the models can include analytic or iterative algorithms or, more recently, deep learning algorithms. These conventional models, however, can have several drawbacks. Many of these nuclear imaging systems, for example, have high memory and computational requirements to reconstruct a medical image. Moreover, many image formation processes employed by at least some of these systems rely on approximations to balance image quality with a desired efficiency. The approximations, however, can lead to lower quality medical images. As such, there are opportunities to address deficiencies in nuclear imaging systems.

SUMMARY

Systems and methods for reconstructing medical images are disclosed.

In some embodiments, a computer-implemented method for generating a first image is disclosed. The method includes receiving sinogram data from an image scanning system. The method also includes applying a plurality of masks to corresponding portions of the sinogram data to generate a plurality of masked sinogram portions. The method further includes applying a plurality of fully connected layers of a neural network to the plurality of masked sinogram portions to generate a plurality of image patches. The method also includes combining the plurality of image patches to generate a first image. The method can further include providing the first image for display.

In some embodiments, a non-transitory computer readable medium stores instructions that, when executed by at least one processor, cause the at least one processor to perform operations comprising receiving sinogram data from an image scanning system. The operations also include applying a plurality of masks to corresponding portions of the sinogram data to generate a plurality of masked sinogram portions. The operations further include applying a plurality of fully connected layers of a neural network to the plurality of masked sinogram portions to generate a plurality of image patches. The operations also include combining the plurality of image patches to generate a first image. The operations can further include providing the first image for display.

In some embodiments, a system for generating a first image is disclosed. The system includes a database and at least one processor communicatively coupled the database. The at least one processor is configured to receive sinogram data from an image scanning system. The at least one processor is also configured to apply a plurality of masks to corresponding portions of the sinogram data to generate a plurality of masked sinogram portions. The at least one processor is further configured to apply a plurality of fully connected layers of a neural network to the plurality of masked sinogram portions to generate a plurality of image patches. The at least one processor is also configured to combine the plurality of image patches to generate a first image. The at least one processor is further configured to store the first image in the database. In some examples, the at least one processor is configured to provide the first image for display.

In some embodiments a computing device receives image data, such as sinogram data, from an image scanning system. The computing device applies a plurality of masks to corresponding portions of the image data to generate a plurality of masked image portions. In some examples, the computing device encodes the image data before the plurality of masks are applied. The computing device applies a neural network that includes a plurality of fully connected layers to the plurality of masked image portions to generate a plurality of image patches. The computing device combines the plurality of image patches to generate an initial image. In some examples, the computing device applies refinement and scaling operations to the initial image and corresponding attenuation maps to generate a final image. In some examples, the computing device stores the final image in a database. In some examples, the computing device provides the final image for display for diagnosis.

BRIEF DESCRIPTION OF THE DRAWINGS

The following will be apparent from elements of the figures, which are provided for illustrative purposes and are not necessarily drawn to scale.

FIG. 3D illustrates the generation of a pixel mask for an image patch, in accordance with some embodiments.

DETAILED DESCRIPTION

Figure 1A:
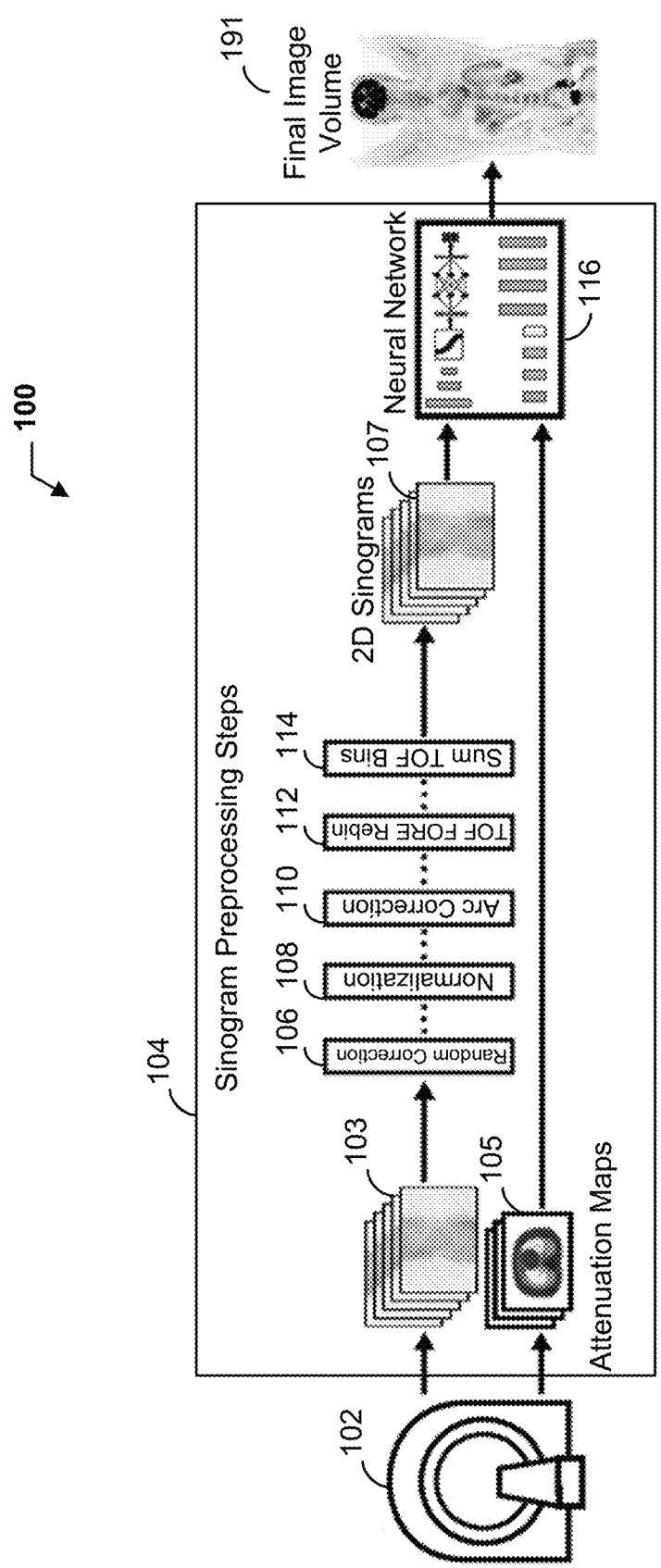
FIG. 1A illustrates a nuclear image reconstruction system, in accordance with some embodiments.

This description of the exemplary embodiments is intended to be read in connection with the accompanying drawings, which are to be considered part of the entire written description.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system. Similarly, claims for methods and systems for training image reconstruction functions can be improved with features described or claimed in context of the methods and systems for image reconstruction, and vice versa.

Various embodiments of the present disclosure can employ machine learning methods or processes to provide clinical information from nuclear imaging systems. For example, the embodiments can employ machine learning methods or processes to reconstruct images based on captured measurement data, and provide the reconstructed images for clinical diagnosis. In some embodiments, machine learning methods or processes are trained, to improve the reconstruction of images.

In some embodiments, a scanning device, such as a positron emission tomography (PET) scanner, provides measurement data, such as three-dimensional (3D) time-of-flight sinograms (e.g., projection data). The measurement data is passed through a neural network with trained parameters to generate a reconstructed image. In some examples, the neural network includes encoding processes, domain transformation processes, and refinement and scaling processes.

In some examples, the domain transformation processes include a Radon inversion layer that employs data masking to filter the sinogram data. The Radon inversion layer includes relatively small fully-connected networks for each image patch of an output image, where each image patch is connected only to a relevant subset of the image data. In some examples, the size of each image patch is configurable (e.g., 20×20 pixels, 40×40 pixels, etc.). In some examples, each image patch is associated with a mask (e.g., sinogram mask), and each mask is independently applied to corresponding portions of encoded (e.g., compressed) sinogram data. An independent fully-connected layer connected to pixels in each relevant image patch generates an initial image based on the masked portions of the encoded sinogram data.

In some examples, the masks are generated based on machine learning processes. For example, a machine learning algorithm can be trained with an image data (e.g., sinogram data) training set (e.g., until convergence) to generate activation maps that identify how much each bin of the image data training set (e.g., as provided by a PET scanner) contributes to each pixel of the output image. As known in the art, a bin is an element of a sinogram, analogous to a pixel in an image. The masks can be generated based on the activation maps.

In some examples, execution of the machine learning algorithm generates values (e.g., weights) identifying the impact each bin of the image training set has on each pixel of the output image. The masks can then be generated based on the weights. In some examples, the weighting is based on a scale from a minimum value (e.g., 0) to a maximum value (e.g., 1), where the minimum value represents no influence, and the maximum represents maximum influence.

In some examples, the masks are generated by forward projecting image patches. For example, given a patch of pixels in image space all set to a same constant non-zero value (e.g., 1), and any remaining image pixels set to zero, performing the Radon transform on the given image (e.g., forward projecting the image into sinogram space) produces a sinogram where the bins in sinogram space corresponding to the pixels of the patch in image space that are non-zero and the remaining sinogram bins are zero, effectively producing a sinogram mask for the given image patch. In some examples, a buffer is added to the projected image patches. The buffer, for example, can improve image quality at patch boundaries.

Among various advantages, the embodiments can reconstruct images from measurement data generated by nuclear imaging systems, such as PET scanners, with reduced computational costs compared to conventional systems and methods. For example, the embodiments can reduce the amount of memory required (e.g., memory requirements) to generate reconstructed images. As another example, the embodiments can generate reconstructed images in less time than conventional systems, given the same computational (e.g., processing) power. In some examples, the embodiments can create quantitatively higher quality images than conventional systems and methods.

In some examples, the embodiments employ a deep neural network with a Radon inversion layer to generate the reconstructed images. The deep neural network can employ masks (e.g., pixel masks) to filter measurement data and generate the reconstructed images. In some examples, the embodiments employ machine learning processes to generate the masks. In some examples, the machine learning processes are trained with additional image data training sets, thereby leading to the generation of more precise masks. Persons of ordinary skill in the art can recognize additional advantages as well.

FIG. 1A illustrates one embodiment of a nuclear imaging system 100. In this example, the nuclear imaging system 100 employs an imaging pipeline using time-of-flight (TOF) Fourier rebinned PET sinogram data and X-ray CT based attenuation maps to generate PET image volumes. As illustrated, nuclear imaging system 100 includes image scanning system 102 and image reconstruction system 104. Image scanning system 102 can be, for example, a PET/CT scanner. The image scanning system 102 generates sinogram data 103, such as TOF sinograms, as well as attenuation maps 105. The sinogram data 103 can represent anything imaged in the scanner's field-of-view (FOV) containing positron emitting isotopes. For example, the sinogram data 102 can represent whole-body image scans, such as image scans from a patient's head to thigh.

Image reconstruction system 104 facilitates the domain transformation from sinogram space (e.g., measurement space) to image space. In some examples, all or parts of image reconstruction system 104 are implemented in hardware, such as in one or more field-programmable gate arrays (FPGAs), one or more application-specific integrated circuits (ASICs), one or more state machines, digital circuitry, or any other suitable circuitry. In some examples, parts or all of image reconstruction system 104 can be implemented in software as executable instructions such that, when executed by one or more processors, cause the one or more processors to perform respective functions as described herein. The instructions can be stored in a non-transitory, computer-readable storage medium, for example.

As illustrated, image reconstruction system 104 processes sinogram data 103 to generate final image volume 191. Final image volume 191 can include image data that can be provided for display and analysis, for example. In this example, random correction 106 of image reconstruction system 104 applies a correction for random measurement data, which can be a source of noise, to sinogram data 103. Image reconstruction system 104 normalizes the output of the random correction 106 by applying normalization 108 (e.g., based on calibration parameters), and then applies an arc correction 110 to the output of normalization 108.

Fourier rebinning 112 is applied to the output of arc correction 110, which can eliminate oblique plane sinograms, to generate rebinned sinogram data (e.g., two-dimensional (2D) TOF rebinned sinogram data). Sum TOF bins 114 receives the rebinned sinogram data and aggregates the rebinned sinogram data (e.g., along the TOF dimension) into 2D (non-TOF) sinograms 107. For example, after Fourier rebinning 112 and sum TOF bins 114 is applied, 2D sinograms 107 can be in the form of a stack of direct-plane 2D sinograms.

Neural network 116 receives 2D sinograms 107 from sum TOF bins 114, as well as attenuation maps 105 from image scanning system 102. Attenuation maps 105 can be generated by a CT imaging system, where the attenuation maps 105 are generated based on X-ray data captured by the CT imaging system. Neural network 116 operates on 2D sinogram data 107 and attenuation maps 105 to generate final image volume 191. For example, a single forward pass of 2D sinograms 107 and attenuation maps 105 through neural network 116 of the PET/CT data produces final image volume 191, which can be a multi-slice image volume.

Figure 1B:
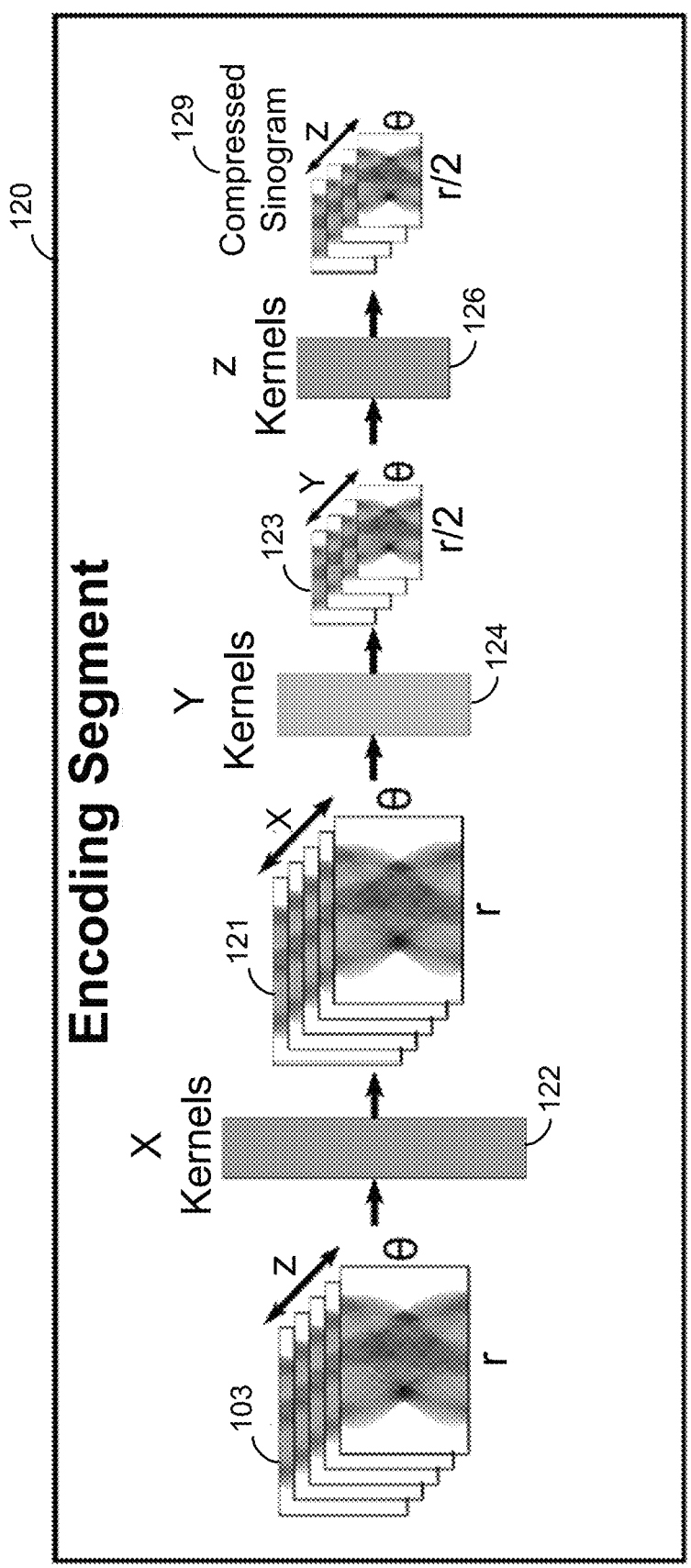
FIG. 1B illustrates an encoding of sinograms, in accordance with some embodiments.
Figure 1C:
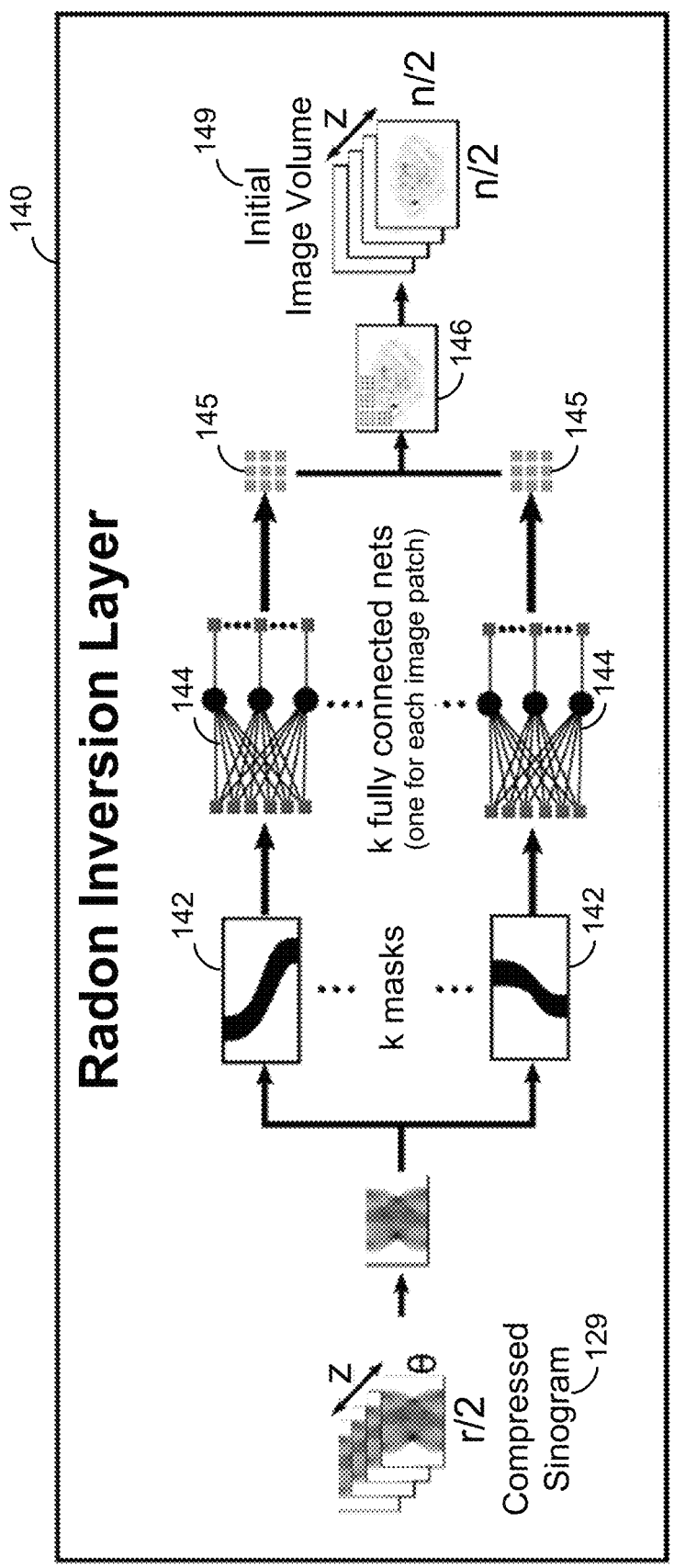
FIG. 1C illustrates a Radon inversion layer of a neural network, in accordance with some embodiments.
Figure 1D:
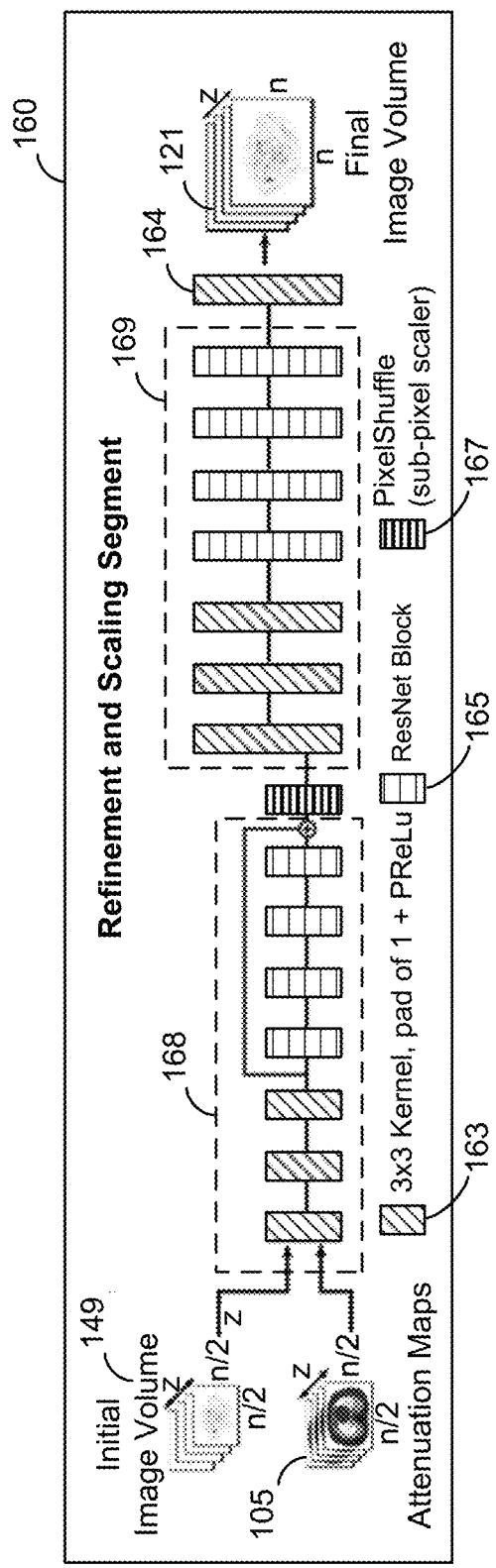
FIG. 1D illustrates a refinement and scaling of images, in accordance with some embodiments.

Neural network 116 includes an architecture that includes encoding segment 120, Radon inversion layer 140, and refinement and scaling segment 160, as illustrated in FIGS. 1B, 1C, and 1D, respectively. Encoding segment 116 can compress sinogram data 103 into a lower dimensional space, where Radon inversion layer 140 uses specially designed sinogram data masking along with fully connected layers (e.g., nets) to carry out a Radon inversion to convert the compressed sinograms into an initial image in image-space. Finally, refinement and scaling segment 160 can enhance and upsample the initial image to generate final image volume 191 (e.g., a multi-slice image volume).

Referring to FIG. 1B, encoding segment 120 is composed of convolutional layers 122, 124, 126 (e.g., convolutional kernels) that compress the sinogram data 103 to generate compressed sinograms 129. By compressing the sinogram data 103, computational resources required to process sinogram data 103 are reduced. For example, memory and processing resources (e.g., power) required to generate final image volume 191 can be reduced.

The convolutional layers 122, 124, 126 can be trained (e.g., with supervised learning) to learn an optimal compression. The training can include training network parameters of each of the convolutional layers 122, 124, 126. In some examples, the convolutional layers 122, 124, 126 are trained based on a type of image scan. For example, the encoding segment 120 can employ first convolutional layers 122, 124, 126 when compressing sinogram data 103 from scans for a first type of tissue (e.g., brain tissue), and can employ second convolutional layers 122, 124, 126 when compressing sinogram data 103 from scans for a second type of tissue (e.g., thorax tissue).

In this example, each convolutional layer 122, 124, 126 extract and forward essential information in each successive layer. For example, first convolutional layer 122 receives sinogram data 103, extracts essential information (e.g., based on its training), and generates first intermediate sinogram 121. Second convolutional layer 124 receives first intermediate sinogram 121 from first convolutional layer 122, extracts essential information (e.g., based on its training), and generates second intermediate sinogram 123. Similarly, third convolutional layer 126 receives second intermediate sinogram 123 from second convolutional layer 124, extracts essential information (e.g., based on its training), and generates compressed sinogram 129.

Each of the convolutional layers 122, 124, 126 can include selected hyperparameters (e.g., based on training), a number of kernels, each kernel representing a convolutional filter acting across multi-slice measurement data. For example, as illustrated, first convolutional layer 122 includes X kernels extracting features along an r sinogram dimension, a θ sinogram dimension, and a z axial slice dimension. Second convolutional layer 124 includes Y kernels extracting features along an r sinogram dimension, a θ sinogram dimension, and a z axial slice dimension. Third convolutional layer 126 includes Z kernels along an r/2 sinogram dimension, a θ sinogram dimension, and a z axial slice dimension. In some examples, the number of kernels for each convolutional layer 122, 124, 126 can be the same (e.g., 128).

In some examples, each of the convolutional layers 122, 124, 126 include 128 3×3 kernels and a Parametric Rectified Linear Unit (PReLU) activation function. In some examples, a different number of kernels and/or a different activation function can be employed. In this example, spatial downsampling is accomplished by the second convolutional layer 124 employing a kernel stride of 2 along the r sinogram dimension, thereby generating second intermediate sinogram 123 with an r sinogram dimension that is half of the r sinogram dimension for first intermediate sinogram 121. In some examples, the axial dimension (e.g., number of slices) of sinogram data 103 is between 1 and 32 slices. For example, the axial dimension of sinogram data 103 can be 16 slices. In some examples, encoding segment 120 is trained with sinogram data 103 that is 16 slices.

Referring to FIG. 1C, Radon inversion layer 140 implements Radon inversion by applying masks 142 to filter the compressed sinogram 129 received from the encoding segment 120, and provides filtered sinograms to fully connected layers 144 (e.g., small fully connected networks) for each of a number of image patches 145 that are then combined 146 to produce an initial image volume 149 (e.g., an initial image estimate).

Some neural network reconstruction techniques employ neural networks with fully connected layers where every input element is connected to every output element. This can result in a multiplicative scaling of memory requirements proportional to the size of the input and the number of neurons, i.e., the number of input sinogram bins and the number of output image voxels.

Figure 4A:
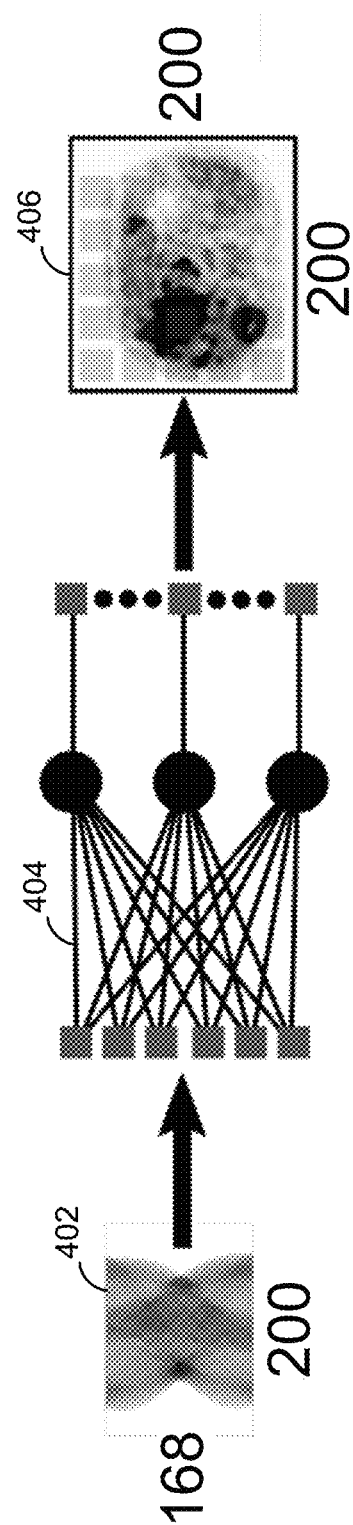
FIGS. 4A and 4B illustrates the reconstruction of an image used to train a neural network, in accordance with some embodiments.
Figure 4B:
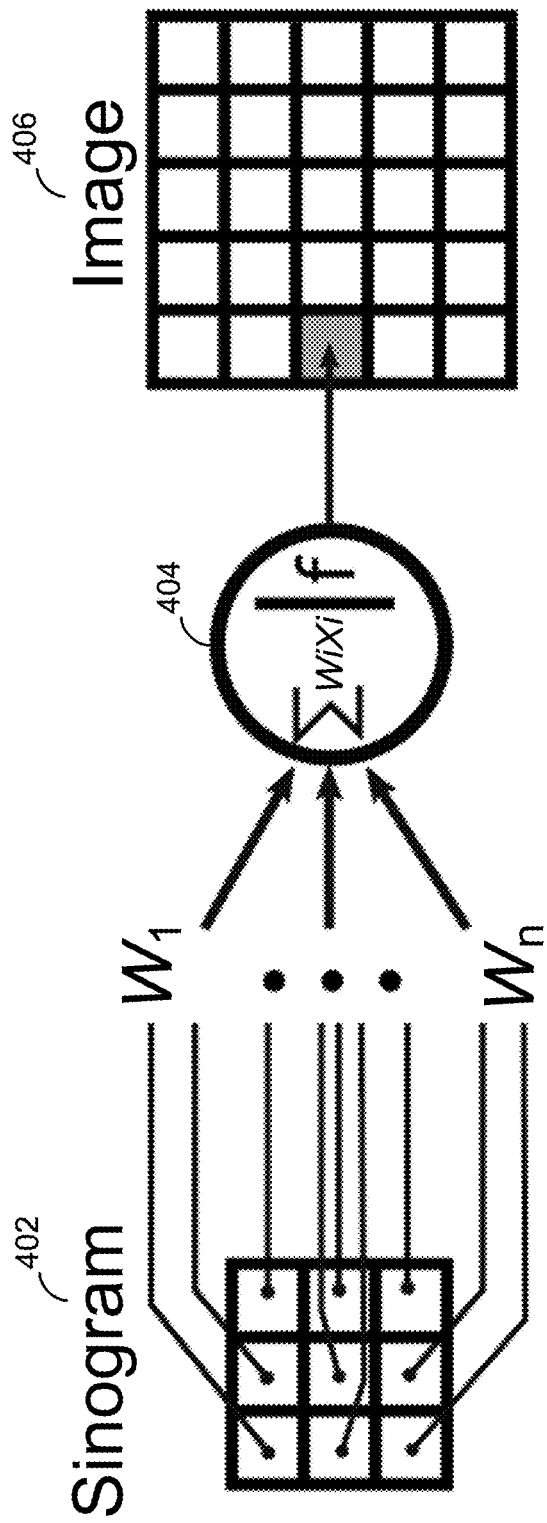

For example, FIGS. 4A and 4B illustrate examples of where each bin of a 200×168 pixel input sinogram 402 is connected to every pixel in a corresponding 200×200 output image 406 via multiple layers of a neural network 404. Specifically, neural network 404 transforms input sinogram 402 from a sinogram domain to an output image 406 in an image domain.

Figure 4C:
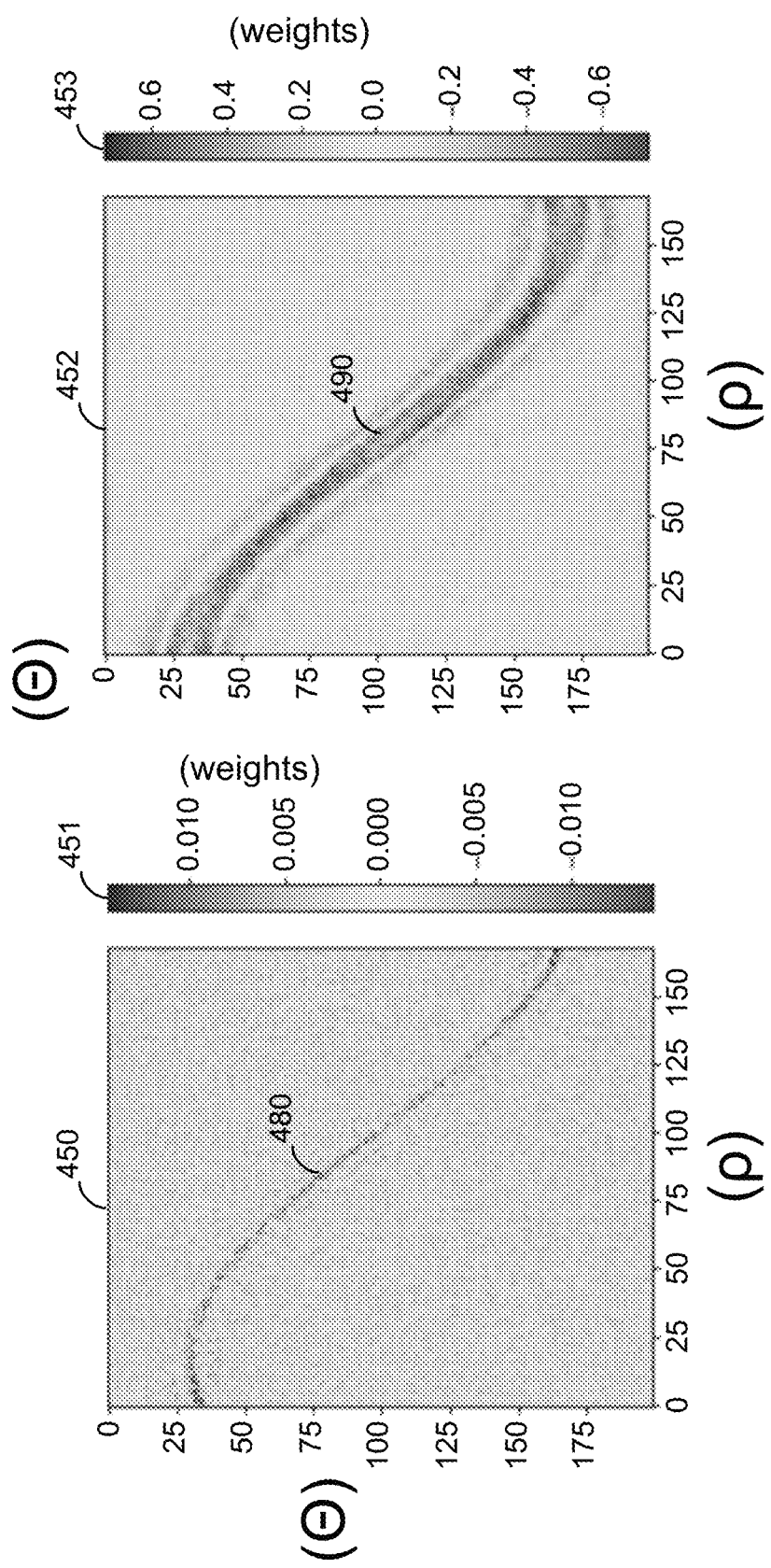
FIG. 4C illustrates an activation map generated based on a trained neural network, in accordance with some embodiments.

FIG. 4C illustrates learned activation maps 450, 452 based on trained neural network 404. In this example, activation map 450 identifies coordinate locations of sinogram bins associated with a given pixel of the image slice. The value of the weights are indicated by a corresponding scale 451. Similarly, activation map 452 identifies coordinate locations of sinogram bins associated with a patch of pixels of the second image slice. The value of the weights are indicated by a corresponding scale 453. The activation maps 450, 452 illustrate that neural network 404 learned an approximation to an inverse Radon transform. For example, activation map 450 illustrates a sinusoidal distribution of activation weights 480 corresponding to a point in image space, and activation map 452 illustrates a sinusoidal distribution of activation weights 490 corresponding to an area in image space. Of note, the majority of weights in each of the activation maps 450, 452 are near-zero, indicating that they do not contribute to the output image. While the vertical axis (axis ρ) in each of activation maps 450, 452 identifies an orthogonal displacement from the center of a field of view, the horizontal axis (axis θ) identifies a projection angle.

Referring back to FIG. 1C, Radon inversion layer 140 provides for an efficient means of performing domain transformation of compressed sinogram 129 in the sinogram domain to initial image volume 149 in the image domain. For example, masks 142 eliminate network connections that do not contribute (or, in some examples, contribute very little) to the output image, initial image volume 149. Radon inversion layer 140 employs (e.g., small) fully connected networks 144 that connect relevant subsets of sinogram data 129 to image patches 145 that are combined to obtain initial image estimate 146. By combining initial image estimates 146, an initial image volume 149 is obtained.

In some examples, masks 142 are based on the activation maps 450, 452 generated as discussed above with respect to FIGS. 4A, 4B, 4C. For example, activation maps 450, 452 can be used to create a sinogram mask 142 for each patch in initial image 146. Each of the masks 142 is independently applied to compressed sinogram 129, and surviving bins (e.g., portions that are not "masked out") are fed to corresponding independent fully connected layers 144 connecting surviving bins to the pixels in a corresponding image patch 145. Application of the masks 142 allows for the elimination of sinogram bins that don't contribute (or contribute very little, e.g., below a threshold amount) to an individual image pixel of each image patch 145. The image patches 145 are reassembled 146 to create the initial image estimate, initial image volume 149. For example, for an initial image volume 149 that is a multi-slice image volume, the domain transformation is carried out independently for each slice in a stack of image slices, and the multi-slice image volume is reassembled based on combining the individual image slices 146.

In some examples, the size of each image patch 145 is predetermined. For example, a user can configure the image patch 145 size, where the size is stored within a database, or any other suitable storage medium. The image patch 145 size can affect, for example, execution speed and/or memory requirements.

For example, assuming that a downsized sinogram of 168×200 pixels is the input (e.g., compressed sinogram 129) to Radon inversion layer 140, and that a half-scale image estimate of 1×200×200 pixels is the output (e.g., initial image volume 149), an image patch 145 size of a single pixel can result in 31,415 fully connected layers 144 (for pixels in the field of view).

As another example, if the patch size is the entire image, just one fully connected layer 144 can be employed. This selection, however, can include up to 1.055 billion network parameters of the one fully connected layer 144.

In some examples, image patches 145 are 40×40 pixels. In some examples, image patches 145 are 30×30 pixels, and in yet other examples, image patches 145 are 50×50 pixels. In some examples, image patches 145 can be configured to be anywhere from 30×30 pixels to 50×50 pixels.

Having selected an image patch 145 size, a learned activation map 450 associated with each pixel in an image patch 145 can be combined (e.g., by summing them together) to form a learned activation map 452. For example, a learned activation map 450 can be generated for every pixel in an image, and can be combined based on a patch size to produce a set of learned activation maps 452 for each patch of the image. However, raw learned activation maps 450, 452 can be noisy. In some examples the masks 142 can be determined based on applying a threshold (e.g., a minimum required weighting) to the activation maps 450, 452. Another refinement method includes a three-step process that can include Gaussian smoothing to filter high frequency noise, morphological opening and closing operations to remove noise and fill gaps, and thresholding using, for example, an iterative minimum cross entropy method.

Figure 5A:
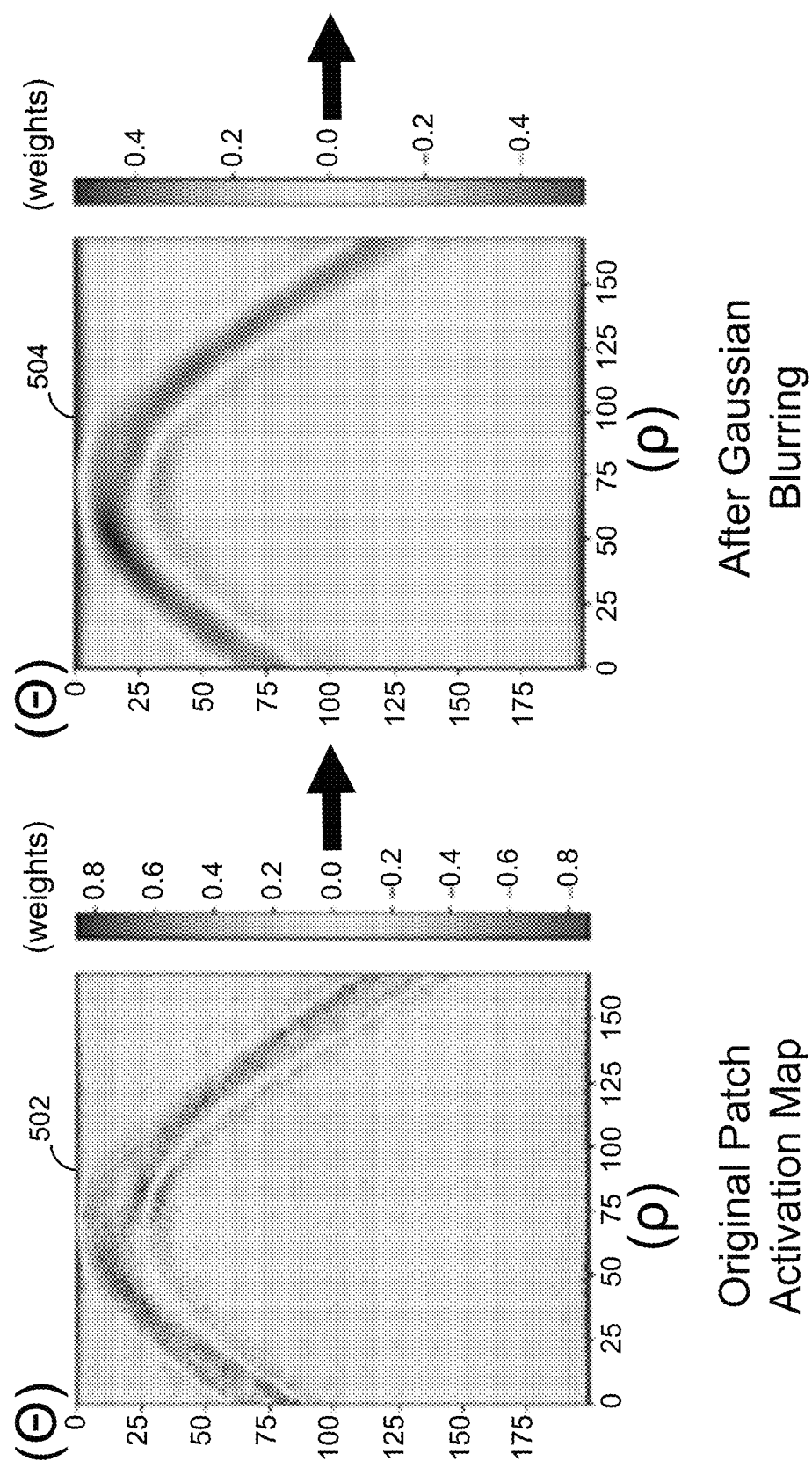
FIGS. 5A and 5B illustrate images at various stages during the generation of a pixel mask, in accordance with some embodiments.
Figure 5B:
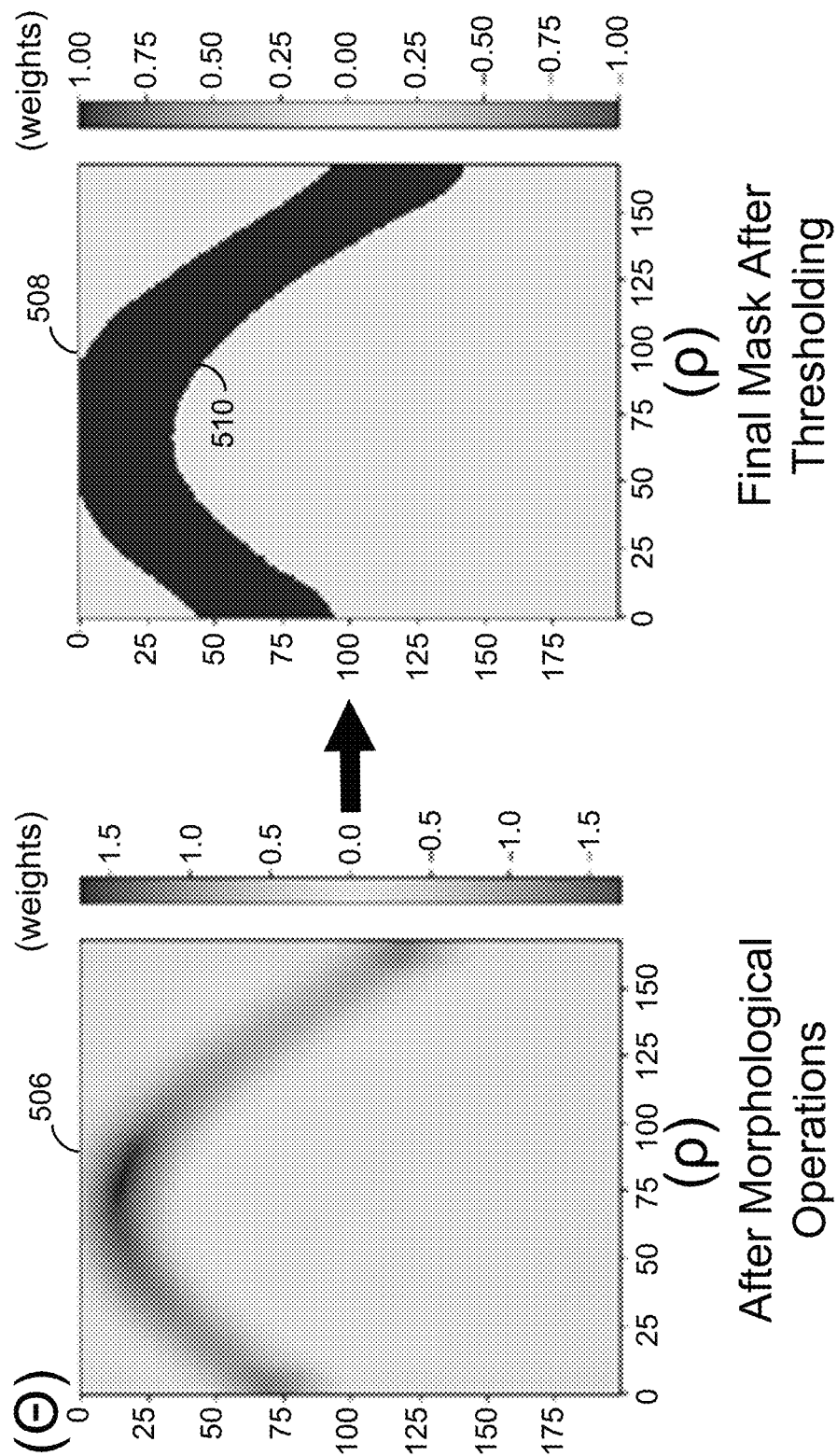

For example, FIGS. 5A and 5B illustrates an example mask 142 refining process. As illustrated, the mask creation process can begin with summing raw pixel activation maps for an image patch, and then applying a process of smoothing, morphological opening and closing, and thresholding to produce a final mask. For example, FIG. 5A illustrates original patch activation map 502, and first intermediate activation map 504. First intermediate activation map 504 illustrates original patch activation map 502 after applying Gaussian blurring. In this example, a Gaussian filter of size 4 was employed.

FIG. 5B illustrates a second intermediate activation map 506, which illustrates a resultant activation map after the application of morphological operations to first intermediate activation map 506. In this example, a disk of radius 8 was employed for morphological opening and closing. FIG. 5B also illustrates final activation map 508, which illustrates second intermediate activation map 506 after thresholding is applied. Final activation map 508 includes learned mask 510, which can be employed as masks 142 in the Radon inversion layer 140. The resulting size of a learned mask 510 can be tuned, in some examples, by adjusting the size of the Gaussian filter and the morphological structuring element.

In some examples, masks 142 can be generated by forward projecting image patches 145 surrounded by a buffer. The size of the buffer can be a design choice and can be used to create an overlap in the space of relevant sinogram bins contributing to a specific image patch 145. The buffer can be a threshold number of pixels beyond the pixels of each image patch 145, for example. For example, the buffer can extend a number of pixels beyond the pixels of each image patch 145. This process is described further below with respect to FIGS. 3A, 3B, and 3C.

Referring now to FIG. 1D, refinement and scaling segment 160 obtains the initial image estimate, initial image volume 149, as well as the corresponding attenuation maps 105. Refinement and scaling segment 160 can remove noise and scale the initial image volume 149 to full size, illustrated as final image volume 121. The attenuation maps 105 provide additional image space anatomical information that can significantly boost the neural network's 116 output image quality. Refinement and scaling segment 160 can perform operations that draw on significant deep learning research in the areas of denoising and super-resolution, for example.

In this example, refinement and scaling segment 160 uses a two-stage strategy, where each stage contains convolutional layers 163 followed by a series of residual blocks 165 (e.g., ResNet blocks) that include an overall skip connection. The strategy is employed first at half spatial resolution (e.g., by sub-segment 168) and then again at full resolution (e.g., by sub-segment 169) after a sub-pixel trans-axial scaling 167 by a factor (e.g., 2) using, in this example, a pixel shuffling technique (e.g., linear pixel shuffling). The pixel shuffling technique can allow refinement and scaling segment 160 to operate on pixels spread smoothly (e.g., uniformly) over initial image volume 149. Sub-segments 168 and 169 are followed by a final convolutional layer 164 that outputs final image volume 121. In this example, all convolutional layers use sixty-four 3×3 convolutional kernels and a PReLU activation function. In some examples, other numbers of convolutional kernels and/or other alternative activation functions (e.g., ReLu, Tan h, sigmoid) can instead be employed.

Figure 2:
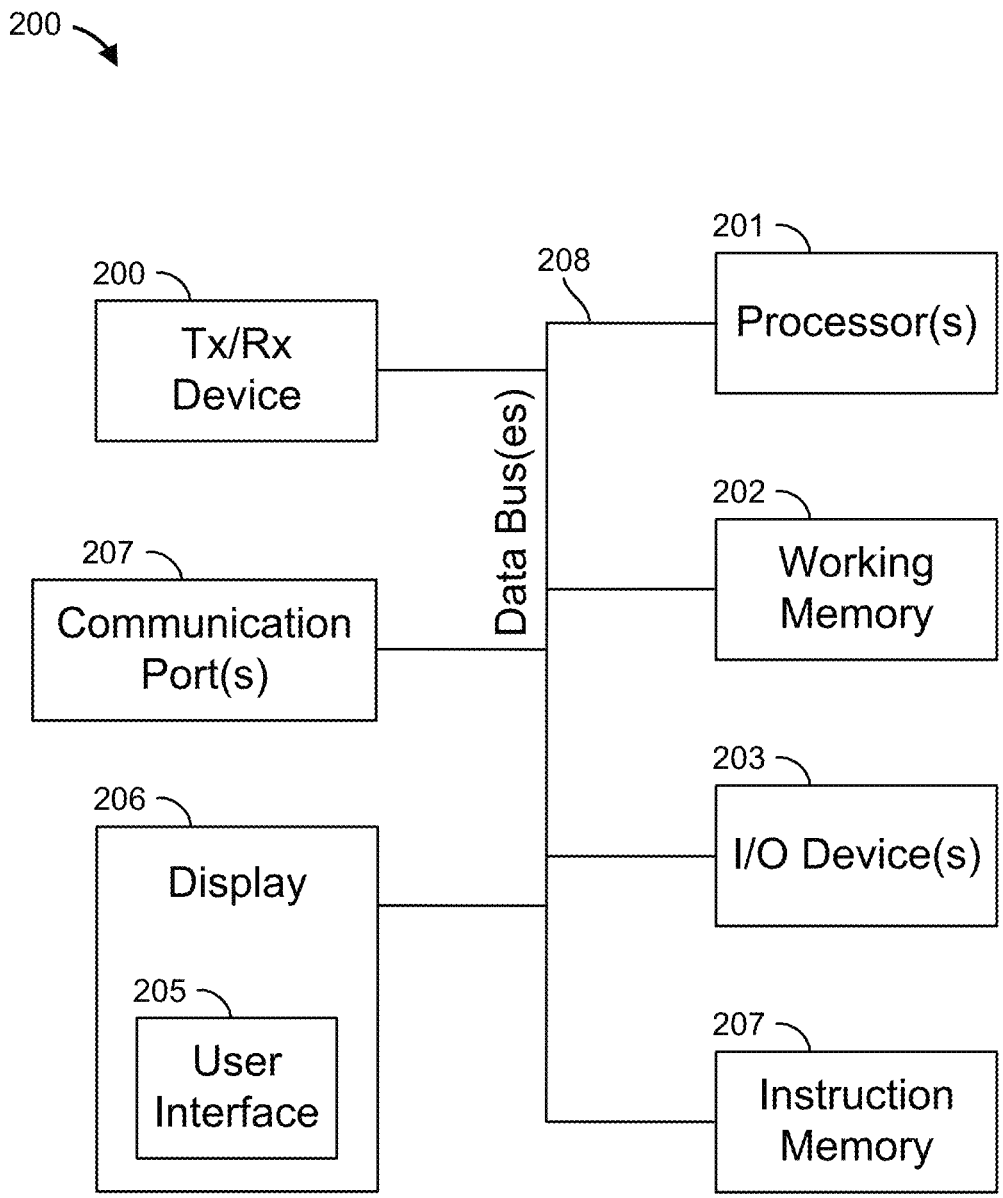
FIG. 2 illustrates a block diagram of an example computing device that can perform one or more of the functions described herein, in accordance with some embodiments.

FIG. 2 illustrates a computing device 200 that can be employed by the image reconstruction system 104. Computing device 200 can implement, for example, one or more of the functions described herein. For example, computing device 200 can implement one or more of the functions of image reconstruction system 104, such as one or more of the encoding segment 120 functions, one or more of the Radon inversion layer 140 functions, or one or more of the refinement and scaling segment 160 functions.

Computing device 200 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 207 can store instructions that, when executed by one or more processors 201, cause one or more processors 201 to perform one or more of the functions of image reconstruction system 104, such as one or more of the encoding segment 120 functions, one or more of the Radon inversion layer 140 functions, or one or more of the refinement and scaling segment 160 functions.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of computing device 200. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as sinograms (e.g., sinogram data 103) and attenuation maps (e.g., attenuation maps 105).

Display 206 can display user interface 205. User interfaces 205 can enable user interaction with computing device 200. For example, user interface 205 can be a user interface for an application that allows for the viewing of final image volumes 191. In some examples, a user can interact with user interface 205 by engaging input-output devices 203. In some examples, display 206 can be a touchscreen, where user interface 205 is displayed on the touchscreen.

Transceiver 204 allows for communication with a network, such as a Wi-Fi network, an Ethernet network, a cellular network, or any other suitable communication network. For example, if operating in a cellular network, transceiver 404 is configured to allow communications with the cellular network. Processor(s) 401 is operable to receive data from, or send data to, a network via transceiver 204.

Figure 3A:
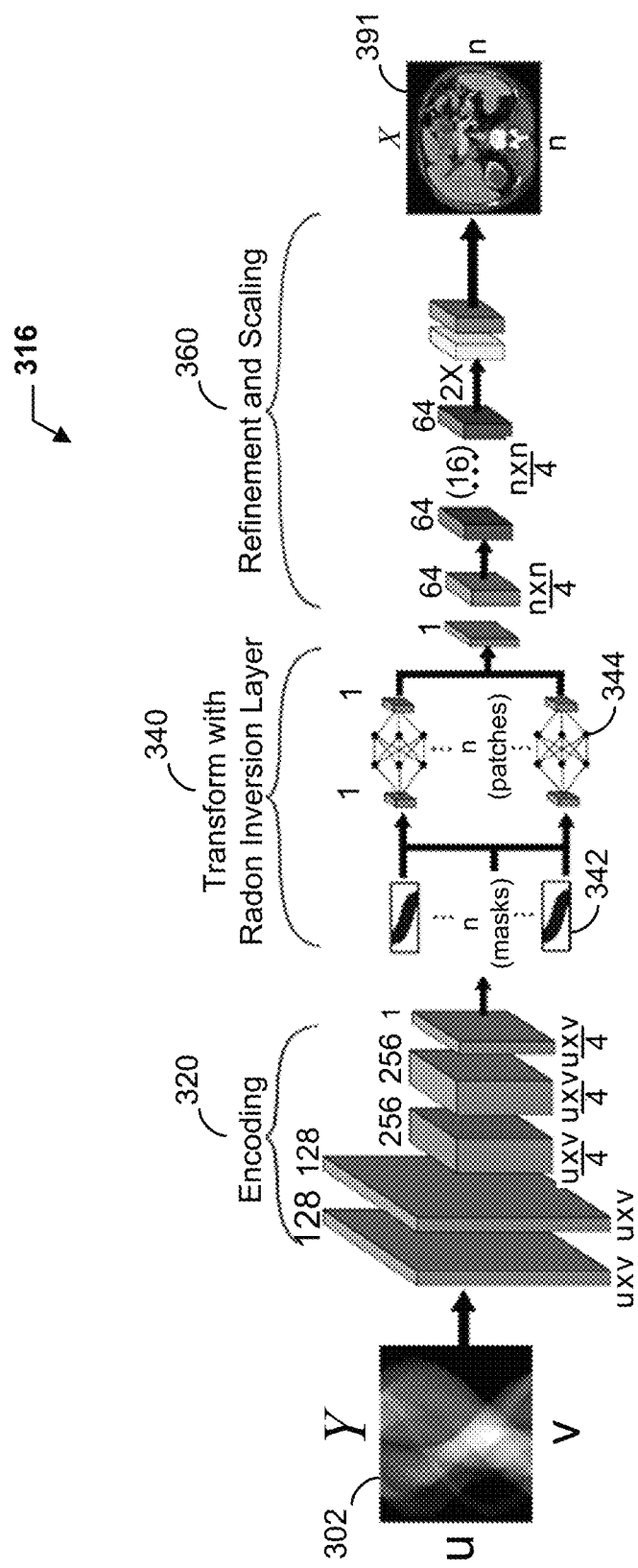
FIG. 3A illustrates a neural network, in accordance with some embodiments.

FIG. 3A illustrates a diagram of a neural network 316 that can be employed by the image reconstruction system 104 of FIG. 1A. In this example, neural network 316 transforms input sinogram 302 into output image 391. Neural network 316 includes encoding segment 120, Radon inversion layer 340, and refinement and scaling segment 360. In this example, encoding segment 320 reduces the dimensionality of input sinogram 302 by a factor of four. Furthermore, Radon inversion layer 340 employs masks 342 and fully connected layers 344 to efficiently convert from measurement space (e.g., sinogram space) to image space to generate an initial image estimate. Refinement and scaling segment 360 obtains the initial image estimate and scales it by a factor, in this example, a factor of two. Refinement and scaling segment 360 further filters out image noise, and generates output image 391.

Figure 3B:
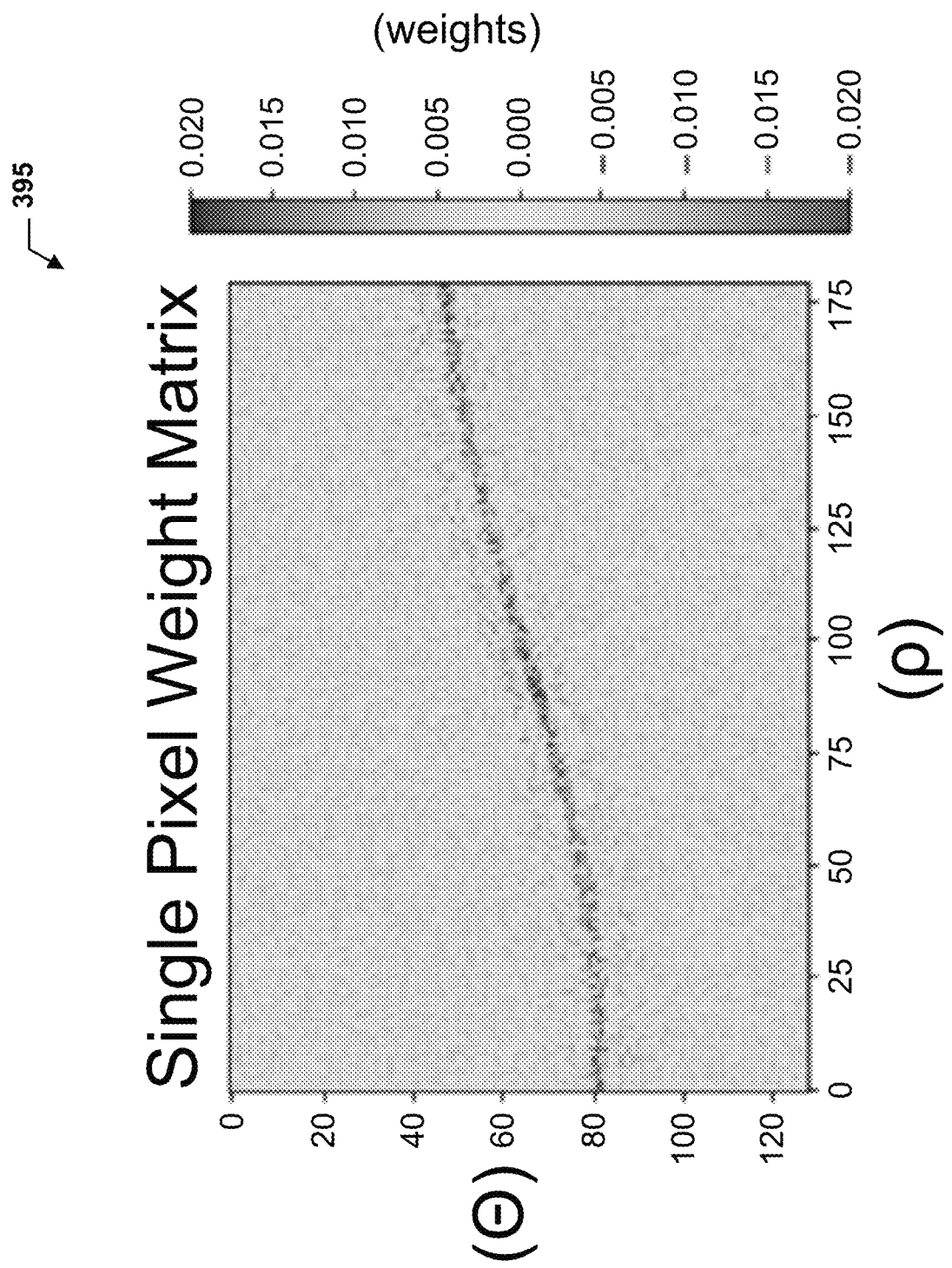
FIG. 3B illustrates a diagram of a single pixel weight matrix, in accordance with some embodiments.

FIG. 3B illustrates a weight matrix 395 for a single image pixel from a fully connected layer 344 trained to perform Radon inversion. As illustrated, a minority of bins contribute to the single image pixel. The efficiency of the Radon inversion layer can be achieved by considering each patch in an output image and a buffer that surrounds the output image independent of all other image patches. In this example, each image patch and its associated buffer are forward projected to create a mask 342 for the input sinogram 302 that isolates only the bins that contribute to the output image 391 illustrated in FIG. 3A.

Figure 3C:
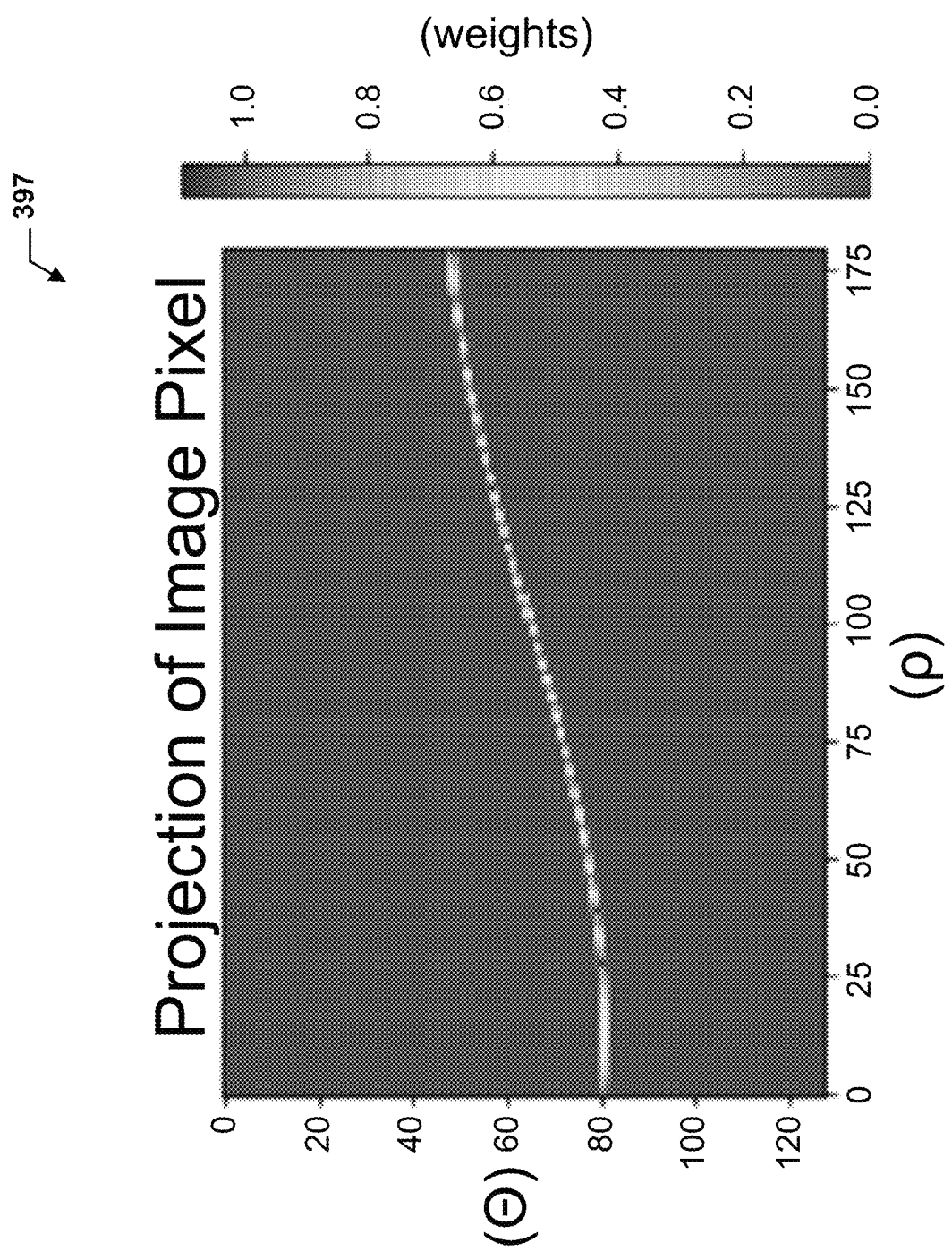
FIG. 3C illustrates a diagram of a forward projection of the single pixel weight matrix of FIG. 1B, in accordance with some embodiments.

FIG. 3C illustrates a forward projection 397 of the same image pixel referred to above with respect to FIG. 3B. For example when compared to FIG. 3B, FIG. 3C illustrates how neural network 316 can utilize additional sinogram bins in the neighborhood of the forward projection, thereby illustrating a need for a spatial buffer around each image patch within Radon inversion layer 340. FIG. 3D illustrates how each mask 342 can be generated by forward projecting a patch of pixels 399 from image 302 that includes a buffer 398. The buffer 398 can be based on a design parameter selected to generate the set of sinogram masks 342. In some examples, buffer 398 is based on a threshold number of pixels on each side of image patch 399. In some examples, a buffer size of buffer 398 is a percentage (e.g., 10%) of an area (e.g., in pixels) of image patch 399.

Figure 6:
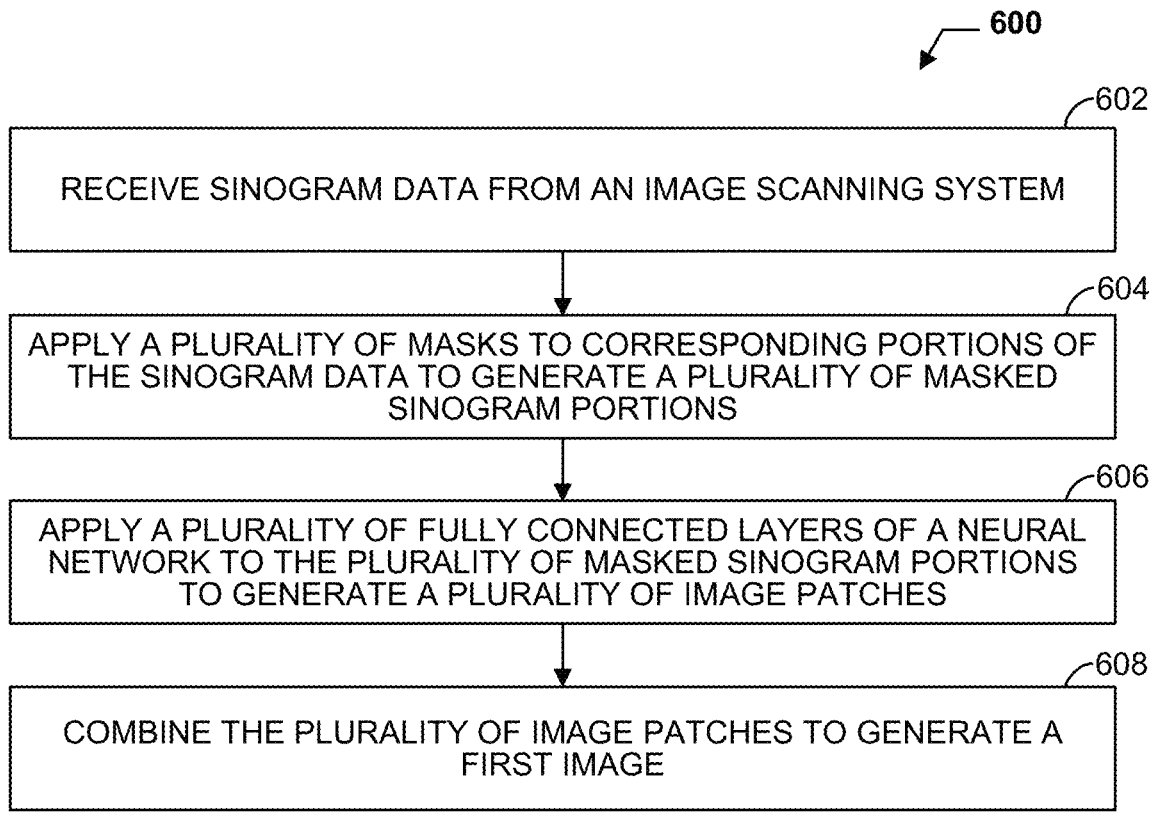
FIG. 6 is a flowchart of an example method to reconstruct an image, in accordance with some embodiments.

FIG. 6 is a flowchart of an example method 600 to reconstruct an image that can be carried out by, for example, computing device 200. Beginning at step 602, sinogram data is received from an image scanning system. For example, the computing device can receive sinogram data from imaging scanning system 102. At step 604, a plurality of masks are applied to corresponding portions of the sinogram data to generate a plurality of masked sinogram portions. For example, computing device 200 can apply a plurality of masks 142 to the corresponding portions of the sinogram data.

Proceeding to step 606, a plurality of fully connected layers of a neural network are applied to the plurality of masked sinogram portions to generate a plurality of image patches. For example, computing device 200 can apply a plurality of fully connected layers 144 to the plurality of masked sinogram portions from masks 142 to generate image patches 145. At step 608, the plurality of image patches are combined to generate a first image. For example, computing device 200 can combine the image patches 145 to generate initial image volume 149.

Figure 7:
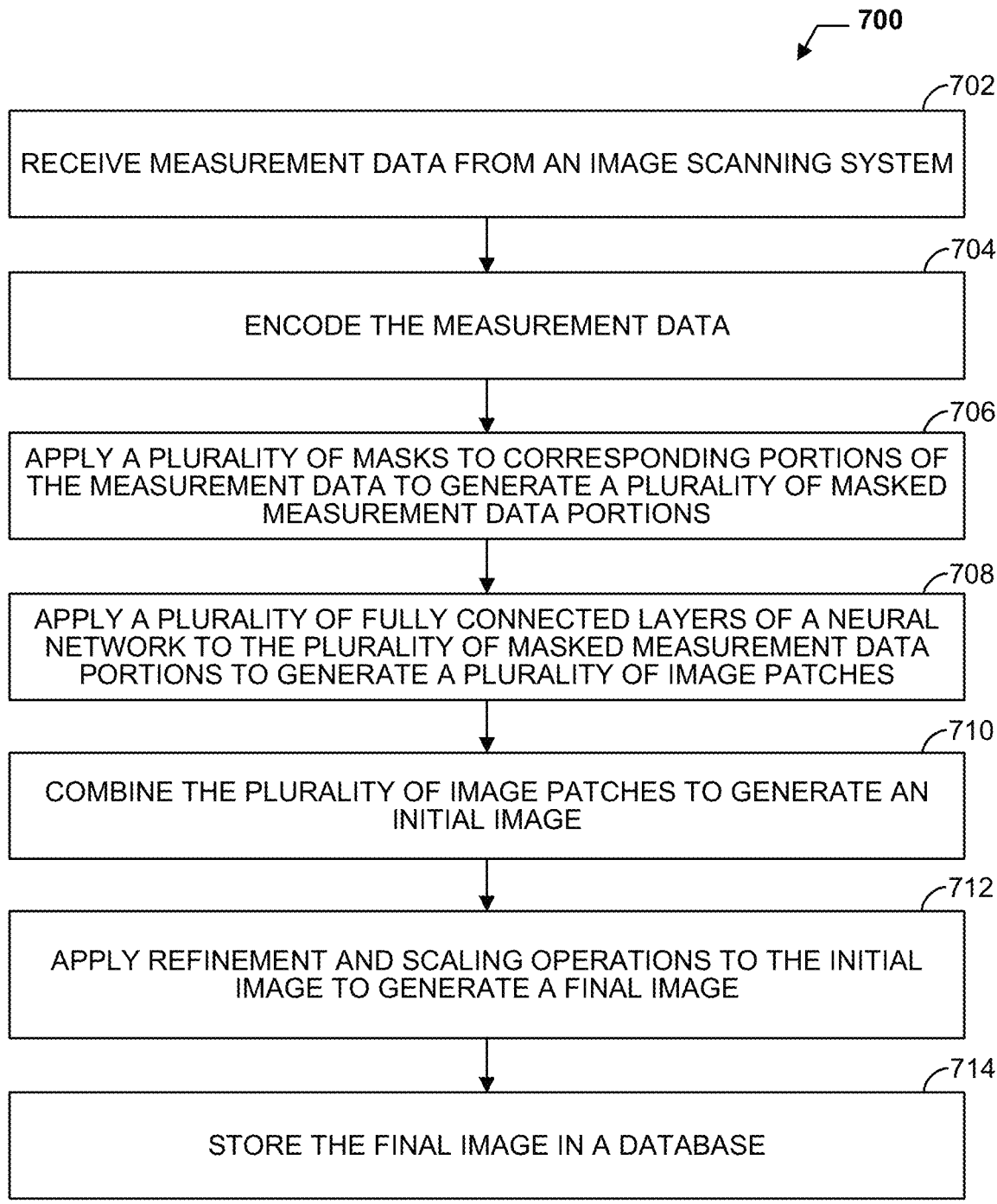
FIG. 7 is a flowchart of another example method to reconstruct an image, in accordance with some embodiments.

FIG. 7 is a flowchart of an example method 700 to reconstruct an image that can be carried out by, for example, computing device 200. Beginning at step 702, measurement data, such as sinogram data, is received from an image scanning system. At step 704, the measurement data is encoded. For example, the computing device 200 can apply one or more of the encoding segment 120 operations described herein to encode the measurement data. At step 706, a plurality of masks are applied to corresponding portions of the encoded measurement data to generate a plurality of masked measurement data portions. For example, the computing device 200 can apply a plurality of masks 142 to the corresponding portions of the measurement data.

Proceeding to step 708, a neural network including a plurality of fully connected layers is applied to the plurality of masked measurement data portions to generate a plurality of image patches. For example, the computing device 200 can apply Radon inversion layer 140, which includes a plurality of fully connected layers 144, to the plurality of masked measurement data portions.

At step 710, the plurality of image patches are combined to generate an initial image. At step 712, refinement and scaling operations are applied to the initial image to generate a final image. For example, the computing device 200 can apply one or more of the refinement and scaling segment 160 operations described herein to the initial image. At step 714, the final image is stored in a database.

In some examples, a computer-implemented method for generating a final image comprises receiving sinogram data from an image scanning system. The method also comprises applying a plurality of masks to corresponding portions of the sinogram data to generate a plurality of masked sinogram portions. In some examples, each one of the plurality of the masked sinogram portions corresponds to one of a plurality of fully connected layers of a neural network. The method further comprises applying the plurality of fully connected layers of the neural network to the plurality of masked sinogram portions to generate a plurality of image patches. In some examples, a size of the plurality of image patches is from 30×30 pixels to 50×50 pixels. The size of the plurality of image patches is, in some examples, configurable by a user. The size can affect execution speed and memory consumption of one or more processing devices applying the method, for example. Further, the method comprises combining the plurality of image patches to generate a first image.

In some examples, the method comprises encoding the sinogram data prior to applying the plurality of masks to the corresponding portions of the sinogram data. In some examples, encoding the sinogram data comprises applying a plurality of convolutional layers to the sinogram data, each convolutional layer including a plurality of kernels, and applying an activation function, such as a Parametric Rectified Linear Unit (PReLU) activation function.

In some examples, the method comprises receiving a plurality of attenuation maps from the image scanning system, wherein the plurality of attenuation maps correspond to each of a plurality of slices of the sinogram data, and applying a plurality of convolutional layers to the first image and to the plurality of attenuation maps to generate a second image (e.g., final image volume 121). In some examples, the method further comprises applying a plurality of residual blocks to the first image and to the plurality of attenuation maps after applying the plurality of convolutional layers to generate the second image.

In some examples, the method comprises generating the plurality of masks based on learned activation maps corresponding to the portions of the sinogram data (e.g., defined image patches). In some examples, the method comprises applying a Gaussian smoothing to the activation maps. The method can further comprise applying morphological opening and closing operations to the activation maps, and applying a thresholding to the activation maps.

In some examples, a non-transitory computer readable medium stores instructions that, when executed by at least one processor, cause the at least one processor to perform operations comprising: receiving sinogram data from an image scanning system; applying a plurality of masks to corresponding portions of the sinogram data to generate a plurality of masked sinogram portions; applying a plurality of fully connected layers of a neural network to the plurality of masked sinogram portions to generate a plurality of image patches; and combining the plurality of image patches to generate a first image.

In some examples, the non-transitory computer readable medium stores instructions that, when executed by at least one processor, cause the at least one processor to perform further operations comprising encoding the sinogram data prior to applying the plurality of masks to the corresponding portions of the sinogram data.

In some examples, the non-transitory computer readable medium stores instructions that, when executed by at least one processor, cause the at least one processor to encode the sinogram data by applying a plurality of convolutional layers to the sinogram data, each convolutional layer including a plurality of kernels, and applying an activation function, such as a Parametric Rectified Linear Unit (PReLU) activation function.

In some examples, the non-transitory computer readable medium stores instructions that, when executed by at least one processor, cause the at least one processor to perform further operations comprising receiving a plurality of attenuation maps from the image scanning system, wherein the plurality of attenuation maps correspond to the sinogram data; and applying a plurality of convolutional layers to the first image and the plurality of attenuation maps to generate a second image (e.g., final image volume 121). In some examples, the non-transitory computer readable medium stores instructions that, when executed by at least one processor, cause the at least one processor to perform further operations comprising applying a plurality of residual blocks to the first image and the plurality of attenuation maps after applying the plurality of convolutional layers to generate the second image.

In some examples, the non-transitory computer readable medium stores instructions that, when executed by at least one processor, cause the at least one processor to perform further operations comprising generating the plurality of masks based on learned activation maps corresponding to the portions of the sinogram data. In some examples, the non-transitory computer readable medium stores instructions that, when executed by at least one processor, cause the at least one processor to perform further operations comprising applying a Gaussian smoothing to the activation maps. The operations can further comprise applying morphological opening and closing operations to the activation maps, and applying a thresholding to the activation maps.

In some examples, a system comprises a database and at least one processor communicatively coupled to the database. The at least one processor is configured to receive sinogram data from an image scanning system. The at least one processor is also configured to apply a plurality of masks to corresponding portions of the sinogram data to generate a plurality of masked sinogram portions. In some examples, each one of the masked sinogram data portions corresponds to one of a plurality of fully connected layers. The at least one processor is further configured to apply a plurality of fully connected layers of a neural network to the plurality of masked sinogram portions to generate a plurality of image patches. In some examples, a size of the plurality of image patches is from 30×30 pixels to 50×50 pixels. Further, the at least one processor is also configured to combine the plurality of image patches to generate a first image.

In some examples, the at least one processor is configured to encode the sinogram data prior to applying the plurality of masks to the corresponding portions of the sinogram data. In some examples, the at least one processor is configured to encode the sinogram data by applying a plurality of convolutional layers to the sinogram data, each convolutional layer including a plurality of kernels, and applying an activation function, such as a Parametric Rectified Linear Unit (PReLU) activation function.

In some examples, the at least one processor is configured to receive a plurality of attenuation maps from the image scanning system, where the plurality of attenuation maps correspond to the sinogram data, and apply a plurality of convolutional layers to the first image and the plurality of attenuation maps to generate a second image (e.g., final image volume 121). In some examples, the at least one processor is configured to apply a plurality of residual blocks to the first image and the plurality of attenuation maps after applying the plurality of convolutional layers to generate the second image.

In some examples, the at least one processor is configured to generate the plurality of masks based on activation maps corresponding to the portions of the sinogram data.

In some examples, the at least one processor is configured to apply a Gaussian smoothing to the activation maps. The at least one processor can also be configured to apply morphological opening and closing operations to the activation maps, and to apply a thresholding to the activation maps.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method for generating a final image comprising:
   receiving sinogram data from an image scanning system;
   applying a plurality of masks to the sinogram data to generate a plurality of masked sinogram portions;
   applying a plurality of fully connected layers of a neural network to the plurality of masked sinogram portions, wherein an output of the neural network is a plurality of image patches;

combining the plurality of image patches to generate a first image;

receiving a plurality of attenuation maps from the image scanning system, wherein the plurality of attenuation maps correspond to the sinogram data; and applying a plurality of convolutional layers to the first image and the plurality of attenuation maps to generate a second image.

2. The computer-implemented method of claim 1 wherein each one of the plurality of masks corresponds to one of the plurality of fully connected layers.

3. The computer-implemented method of claim 1 further comprising encoding the sinogram data prior to applying the plurality of masks to the sinogram data.

4. The computer-implemented method of claim 3 wherein encoding the sinogram data comprises:

applying a plurality of convolutional layers to the sinogram data, each convolutional layer including a plurality of kernels; and applying an activation function.

5. The computer-implemented method of claim 1, wherein a size of the plurality of image patches is from 30×30 pixels to 50×50 pixels.

6. The computer-implemented method of claim 1 further comprising applying a plurality of residual blocks to the first image and the plurality of attenuation maps after applying the plurality of convolutional layers to generate the second image.

7. The computer-implemented method of claim 1, further comprising generating the plurality of masks based on activation maps corresponding to the portions of the sinogram data.

8. The computer-implemented method of claim 7 further comprising:

applying a Gaussian smoothing to the activation maps;

applying morphological opening and closing operations to the activation maps; and applying a thresholding to the activation maps.

9. A non-transitory computer readable medium storing instructions that, when executed by at least one processor, cause the at least one processor to perform operations comprising:

receiving sinogram data from an image scanning system;

applying a plurality of masks to the sinogram data to generate a plurality of masked sinogram portions;

applying a plurality of fully connected layers of a neural network to the plurality of masked sinogram portions, wherein an output of the neural network is a plurality of image patches;

combining the plurality of image patches to generate a first image, receiving a plurality of attenuation maps from the image scanning system, wherein the plurality of attenuation maps correspond to the sinogram data; and applying a plurality of convolutional layers to the first image and the plurality of attenuation maps to generate a second image.

10. The non-transitory computer readable medium of claim 9 storing instructions that, when executed by at least one processor, further cause the at least one processor to perform operations comprising encoding the sinogram data prior to applying the plurality of masks to the sinogram data.

11. The non-transitory computer readable medium of claim 10 wherein encoding the sinogram data comprises:

applying a plurality of convolutional layers to the sinogram data, each convolutional layer including a plurality of kernels; and applying an activation function.

12. The non-transitory computer readable medium of claim 9 storing instructions that, when executed by at least one processor, further cause the at least one processor to perform operations comprising applying a plurality of residual blocks to the first image and the plurality of attenuation maps after applying the plurality of convolutional layers to generate the second image.

13. A system comprising:

a database; and at least one processor communicatively coupled to the database and configured to:

receive sinogram data from an image scanning system;

apply a plurality of masks to the sinogram data to generate a plurality of masked sinogram portions;

apply a plurality of fully connected layers of a neural network to the plurality of masked sinogram portions, wherein an output of the neural network is a plurality of image patches;

combine the plurality of image patches to generate a first image;

receiving a plurality of attenuation maps from the image scanning system, wherein the plurality of attenuation maps correspond to the sinogram data; and applying a plurality of convolutional layers to the first image and the plurality of attenuation maps to generate a second image.

14. The system of claim 13, wherein each one of the plurality of masks corresponds to one of the plurality of fully connected layers.

15. The system of claim 13, wherein the at least one processor is configured to encode the sinogram data prior to applying the plurality of masks to the sinogram data.

16. The system of claim 15, wherein encoding the sinogram data comprises:

applying a plurality of convolutional layers to the sinogram data, each convolutional layer including a plurality of kernels; and applying a Parametric Rectified Linear Unit (PReLU) activation function.

17. The system of claim 13, wherein the at least one processor is configured to generate the plurality of masks based on activation maps corresponding to the portions of the sinogram data.

18. The non-transitory computer readable medium of claim 9 storing instructions that, when executed by at least one processor, further cause the at least one processor to perform operations comprising:

applying a Gaussian smoothing to the activation maps;

applying morphological opening and closing operations to the activation maps; and applying a thresholding to the activation maps.

19. The non-transitory computer readable medium of claim 9 storing instructions that, when executed by at least one processor, further cause the at least one processor to perform operations comprising generating the plurality of masks based on activation maps corresponding to the portions of the sinogram data.

20. The system of claim 13, wherein the at least one processor is configured to:
   apply a Gaussian smoothing to the activation maps;
   apply morphological opening and closing operations to the activation maps; and
   apply a thresholding to the activation maps.

* * * * *